United States Patent [19]
Kang et al.

[11] Patent Number: 6,003,015
[45] Date of Patent: Dec. 14, 1999

[54] ORDER CONFIRMATION SYSTEM AND METHOD OF USING SAME

[75] Inventors: Chao Ming Kang, San Diego; Thomas H. Stanford, Escondido; David W. Snyder, Santee, all of Calif.

[73] Assignee: HM Electronics, Inc., San Diego, Calif.

[21] Appl. No.: 08/608,252

[22] Filed: Feb. 28, 1996

[51] Int. Cl.$^6$ ................................................ G06F 17/60
[52] U.S. Cl. .......................... 705/15; 705/24; 312/100; 315/149; 348/150; 348/148
[58] Field of Search .................. 705/1, 13, 15, 705/16, 20, 24; 345/22, 326, 214, 2, 3, 10, 32, 84; 348/148, 150; 315/149, 151; 313/11, 55, 36, 37, 38; 312/7.2, 100, 114, 116

[56] References Cited

U.S. PATENT DOCUMENTS

| | | | |
|---|---|---|---|
| 4,370,695 | 1/1983 | Penick | 361/213 |
| 4,386,345 | 5/1983 | Narveson et al. | 345/22 |
| 4,516,055 | 5/1985 | Nelson | 315/151 |
| 4,589,022 | 5/1986 | Prince et al. | 348/602 |
| 4,634,918 | 1/1987 | Kato et al. | 313/36 |
| 4,668,026 | 5/1987 | Lapeyre et al. | 312/223.3 |
| 4,740,727 | 4/1988 | Inaida et al. | 313/36 |
| 4,806,583 | 2/1989 | Battaglia | 524/315 |
| 5,053,868 | 10/1991 | Higgins et al. | 348/150 |
| 5,168,354 | 12/1992 | Martinez et al. | 348/150 |
| 5,357,596 | 10/1994 | Takebayashi et al. | 704/275 |
| 5,577,165 | 11/1996 | Takebayashi et al. | 704/275 |

*Primary Examiner*—Stephen R. Tkacs
*Attorney, Agent, or Firm*—Higgs, Fletcher& MackLLP; Bernard L. Kleinke

[57] ABSTRACT

A new and improved video order confirmation method and system that is adapted for use with a point-of-sale terminal and an audio order confirmation station to facilitate customer throughput. The video order confirmation system and method includes a point of sales terminal for receiving order input information from an order taker in response to order requests from a customer, and a video confirmation order terminal to facilitate order confirmation by the customer. The order confirmation terminal includes a free standing terminal housing having a microprocessor and display unit mounted therein for translating order items entered by an order taker at the point-of-sales terminal, into pixel images indicative of the description of the item ordered, the quantity of the item ordered, the unit price of the item ordered, the total price of the item or items ordered, and the accumulated total of all items ordered at any given time during the order process. For the purpose of protecting the display unit from vandalism, the system further includes a remote controlled motorized security shield that covers the display unit during non business hours.

15 Claims, 12 Drawing Sheets

MAIN

CALCULATE

CORRECTION

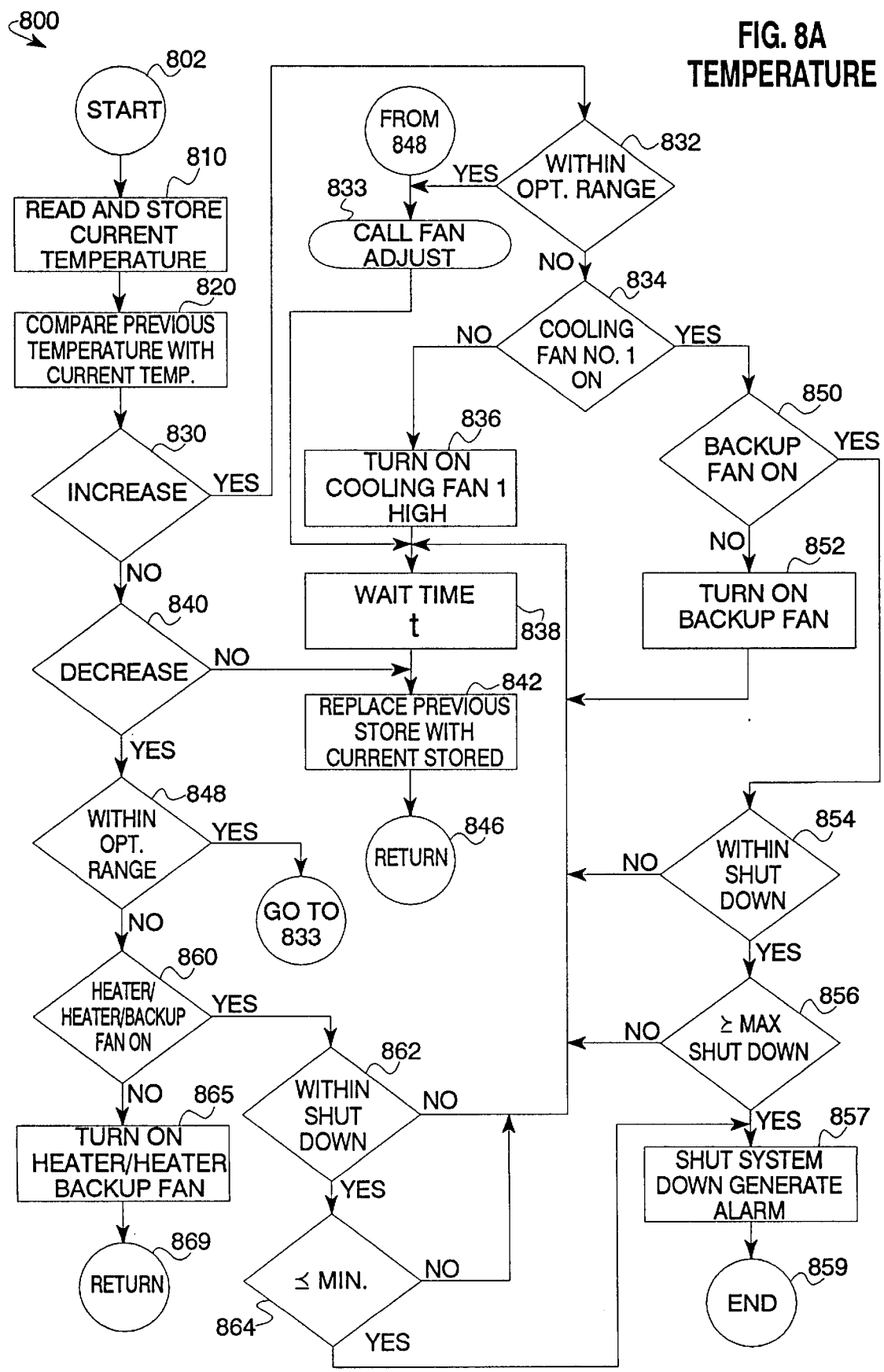

```
         ┌─────────────────────────────┐
  ╱ 1000 │ 1 HAMBURGER ........ $1.60  │← 1002
         │ 1 FRIES ............ $ .80  │← 1004
         │ 2 SOFTDRINKS ....... $2.60  │← 1006
         │       SUBTOTAL . $5.00      │← 1008
         │       TAX ..... $ .40       │← 1009
         │       TOTAL ... $5.40       │← 1010
         └─────────────────────────────┘
```

FIG. 10

```
         ┌─────────────────────────────┐
         │ 1 HAMBURGER ........ $1.60  │← 1102
         │ 1 FRIES ............ $ .80  │← 1104
         │ 2 SOFTDRINKS ....... $2.60  │← 1106
         │ 1 VANILLA SHAKE .... $1.30  │← 1107
         │       SUBTOTAL . $6.30      │← 1108
         │       TAX ..... $ .50       │← 1109
         │       TOTAL ... $6.80       │← 1110
         └─────────────────────────────┘
```

FIG. 11

```
  1202 → │ 1 HAMBURGER ........ $1.60  │
  1204 → │ 2 FRIES ............ $1.60  │
  1206 → │ 1 SOFTDRINK ........ $1.30  │
  1207 → │ 1 VANILLA SHAKE .... $1.30  │
         │       SUBTOTAL . $5.80      │← 1208
         │       TAX ..... $ .46       │← 1209
         │       TOTAL ... $6.26       │← 1210
```

FIG. 12

ORDER CONFIRMATION SYSTEM AND METHOD OF USING SAME

TECHNICAL FIELD

The present invention relates in general to order confirmation systems and their method of use and more particularly relates to a video order confirmation system and its method of use.

BACKGROUND ART

There are many different types and kinds of order confirmation systems that help facilitate customer throughput. In this regard, such prior known systems include both audio and visual systems that help facilitate the processing of customer orders.

For example, in a typical large modern super market, a customer brings his or her order to a check out stand for processing by an order checker. The order checker causes each item selected by the customer to be scanned by a bar-code reader coupled to a point of sales terminal. As each item is scanned, the point of sales terminal displays on a display device a brief description of the item and its price for confirmation by the customer. In this regard, if the customer believes the displayed price is inaccurate a price check can be immediately requested to verify the correctness of the displayed item and price.

At the conclusion of the order processing, the checker verbally confirms with the customer that the order is complete. If the order is completed, the checker causes the point of sales terminal to display the total price of the customer order for verification and payment by the customer. Thus, the displaying of the price of individual ones of the items in combination with the use of a high speed bar code reader helps facilitate both accuracy and customer throughput.

Another example of a order confirmation system is found in today's fast-food restaurants. In this environment, the customer views a menu board which displays the names and prices of the various available food items. The customer then selects the items desired and verbally informs an order-taker of his or her selections. As each item is announced by the customer, the order taker depresses a keypad on a food item keypad selection device coupled to a point of sale terminal, which in turn, causes the name of the item and its associate price to be displayed on a display bar for verification by the customer. If the customer has placed his or her order from a drive-up station, the order taker must repeat each item ordered over a full-duplex communication system for customer verification purposes.

When the customer has completed his or her order, the order taker depresses a total sales button on the food item keypad device, which in turn, causes the total price of the order to be displayed for verification and payment by the customer. Again, if the customer is at a drive-up station, the order taker must announce the total price to the customer for verification purposes. Thus, like the point of sales terminal in a super market, the displaying of the name of the individual items and their associated prices at the point of sales terminal in a fast food restaurant also helps facilitate customer verification of order accuracy and price to improve customer throughput.

Although prior known point of sales systems have improved customer throughput, they have not proven entirely satisfactory. In this regard, once an item has been displayed for customer verification, the displayed item is removed and immediately replaced from the display unit as soon as another item is scanned or entered by an order taker. Thus, the customer must constantly direct his or her attention to the display unit at all times or suffer losing the window of opportunity for item and price verification.

Therefore, it would be highly desirable to have a new and improved order confirmation system that enables a customer to verify the accuracy of each item ordered at all items while the order is being placed and until the entire order has been approved.

Another problem with prior known systems has been the loss of time associated with correcting a customer's order during the order taking process. For example, in a fast food restaurant environment, a customer may not have a sufficient amount of money to pay for the food items ordered or may not have heard the order taker when he or she repeats the item ordered for customer verification purposes. Thus, at the end of the order taking process, the customer may need to cancel one or more items, if the item requested was not properly ordered or if the total price of the order exceeds the funds available to the customer.

Therefore, it would be highly desirable to have a new and improved order confirmation system that enables a customer to verify not only the individual item and prices of the items ordered, but also the total accumulated charges incurred during the ordering process.

Thus, while such prior known systems may have helped to improve order accuracy and customer throughput, it would be highly desirable to have a new and improved method and order confirmation system that provides a customer with a visual verification of his or her entire order and that also eliminates the need for an order taker to repeat and verify the order placed by the customer.

Such a new and improved order confirmation system should also be adapted for use with both point-of-sale terminals and audio order stations to facilitate customer throughput regardless of whether the order is placed at an order point within a business establishment, such as at a check out station at a super market, or outside a business establishment, such as at a drive through order station at a fast food restaurant.

DISCLOSURE OF INVENTION

Therefore, the principal object of the present invention is to provide a new and improved order confirmation method and system that enables a customer to verify his or her order without the necessity of the order taker repeating the order for verification purposes.

Another object of the present invention is to provide such a new and improved order confirmation method and system that enables a customer to verify the accuracy of his or her order in its entirety at any time during the order taking process. Such a new and improved system should enable the customer to verify the accuracy of the description of each item ordered, the quantity ordered and the price charged for the item or items.

Still yet another object of the present invention is to provide such a new and improved order confirmation method and system that enables a customer to verify the total accumulated charges for the order process. Such a new and improved method and system should enable verification of the accumulated charges at any time during the order taking process.

Briefly, the above and further objects of the present invention are provided by a new and improved video order confirmation method and system that is adapted for use with a point-of-sale terminal and an audio order confirmation station to facilitate customer throughput.

The video order confirmation system and method includes a point of sales terminal for receiving order input information from an order taker in response to order requests from a customer, and a video confirmation order terminal to facilitate order confirmation by the customer. The order confirmation terminal includes a drive-up terminal housing having a microprocessor and display unit mounted therein for translating order items entered by an order taker at the point-of-sales terminal, into pixel images indicative of the description of the item ordered, the quantity of the item ordered, the unit price of the item ordered, the total price of the item or items ordered, and the accumulated total of all items ordered at any given time during the order process.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 10–12 are illustrations of various sequential video images displayed on the display at the drive-up station of FIG. 1.

BEST MODE FOR CARRYING OUT THE INVENTION

Figure 1:
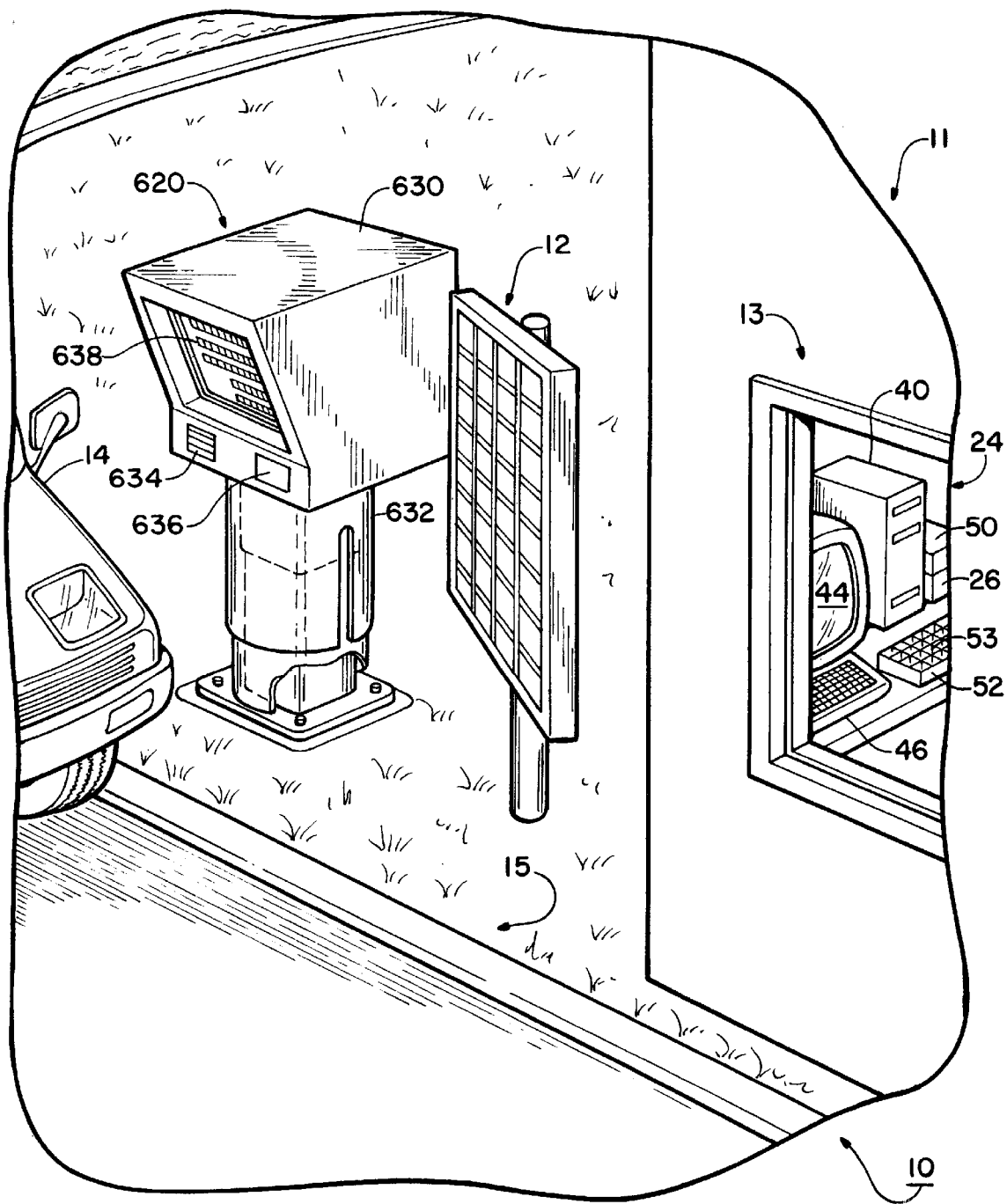
FIG. 1 is a pictorial view of a drive-up video order confirmation system, which is constructed in accordance with the present invention, illustrating a drive-up station at a fast food restaurant.

Referring now to the drawings, and more particularly to FIG. 1, there is shown a video order confirmation system 10 which is constructed in accordance with the present invention, and which is illustrated at a drive-up fast food restaurant 11, having a food selection menu board 12. In this regard, the video order confirmation system 10 enables a drive-up customer in a vehicle 14 to place his or her food order with an order taker (not shown) and to receive immediate visual confirmation of each food item the order taker has understood the customer to have ordered from the food selection menu board 12 and for delivery at a drive-up food receiving window, such as the window 13. The customer, also via the system 10, is able to see a visual presentation of the quantity of each item ordered, the unit price of each item ordered, and the price of the total order, including any taxes, such as a sales tax, that may be applied to the food order placed by the customer. Thus, with the system 10, the customer is able to confirm visually the food order he or she has placed, and in the event of any communication error or order entry error caused by the customer and the order taker respectively, the customer is able to notify the order taker immediately of the error the customer has determined visually.

Figure 2:
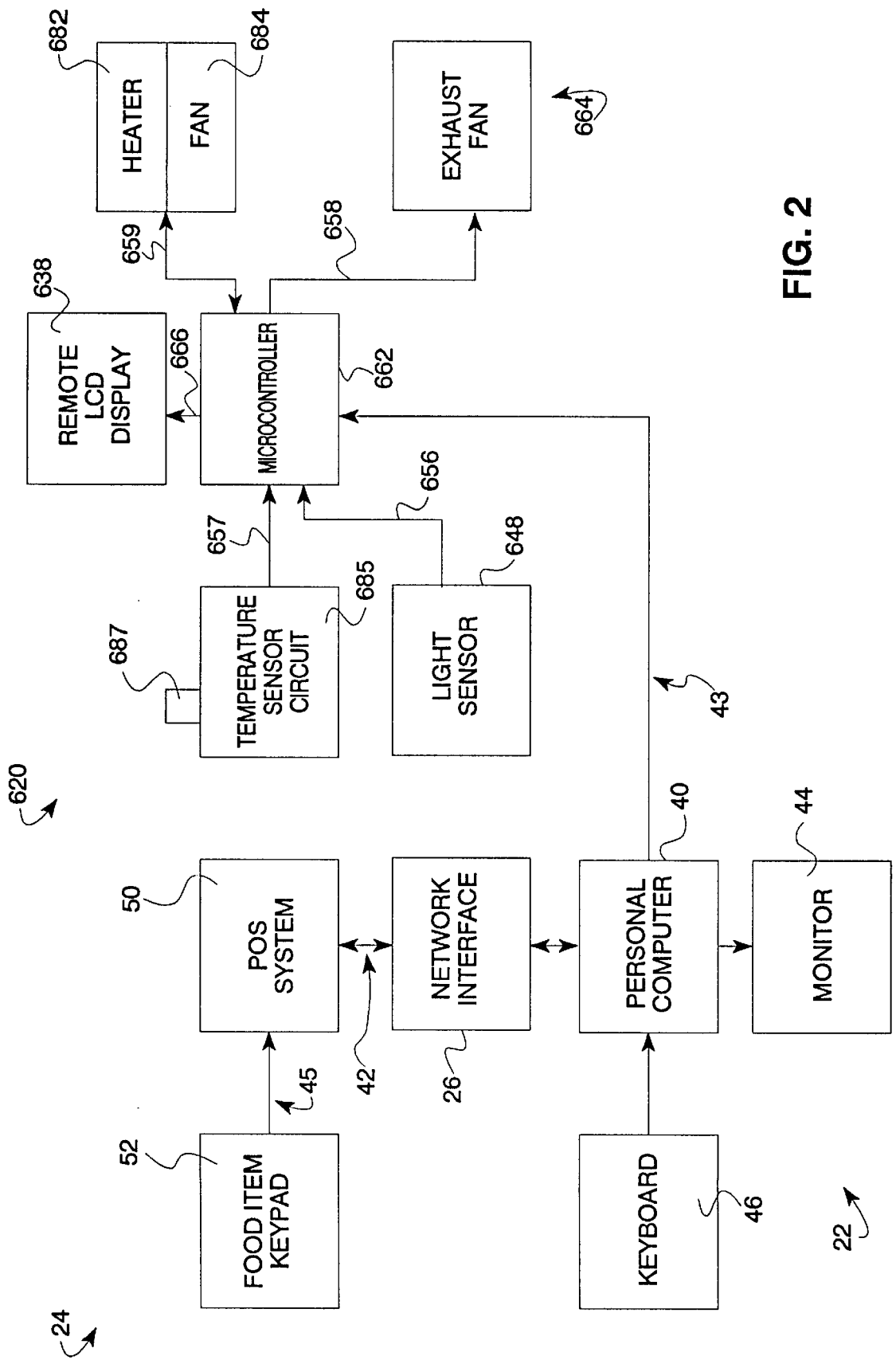
FIG. 2 is a block diagram of the video order confirmation system of FIG. 1.

Considering now the video order confirmation system 10 with reference to FIGS. 1 and 2, the video order confirmation system 10 generally includes a drive-up video order confirmation station 620 for permitting a customer to place a food order verbally with the order taker working within the fast food restaurant 11, and for permitting the customer to visually verify the order as it is transmitted within the restaurant 11 to various other personnel for order preparation purposes.

In order to enable the customer as well as the other personnel within the restaurant 11 to visually confirm the order as transmitted by the order taker, the system 10 also includes an order distribution system 22 (FIG. 2) coupled electrically to the order confirmation station 620 and interfaced to a point of sale station 24 via a network interface 26. As will be explained hereinafter in greater detail, the network interface 26 couples the information entered by the order taker, as he or she receives verbal requests from the customer, to the order confirmation station 620 and thence to the other work stations within the restaurant so the order can be processed and prepared for the customer. The network interface 26 also couples the entered information back to the order confirmation station 620 for immediate verification by the customer and thus, helps improve customer order accuracy and the overall efficiency of the personnel processing and preparing the order placed by the customer.

Considering now the drive-up video order confirmation station 620 in greater detail with reference to FIG. 1, the drive-up video order confirmation station 620 generally includes a stand alone housing 630 which is mounted on an adjustable pedestal 632 that is disposed in close proximity to a drive-up lane 15. A microphone unit 634 and a speaker unit 636 are mounted spaced apart from one another in the housing 630 to enable the customer to give his or her food order verbally to the order taker and to enable the customer to hear verbal communications from the order taker or other personnel from within the restaurant 11.

In order for the customer to confirm his or her order visually, a display monitor 638 is mounted within the housing 632. The display monitor 638 in the preferred form of the present invention is a liquid crystal display unit. An anti-glare screen 640 is disposed in close proximity to the display unit 638 to help reduce glare on the face of the display unit 638. It should be understood by those skilled in the art, however, that other types of display units, such as a cathode ray tube display or a light emitting diode display can also be employed.

Considering now the order distribution system 22 in greater detail with reference to FIGS. 1–2, the order distribution system 22 generally includes a personal computer 40 having an internal video drive module (not shown) for coupling a video signal 43 indicative of customer order information to the display monitor 638 for confirmation by the customer. An order verification display monitor 44 is also coupled to the video drive module so that order taker and/or other personnel within the restaurant can verify visually the order information entered for the customer. In order to enable programming information to be entered into the personal computer 40, the order distribution system 22 also includes a keyboard 46.

Figure 3:
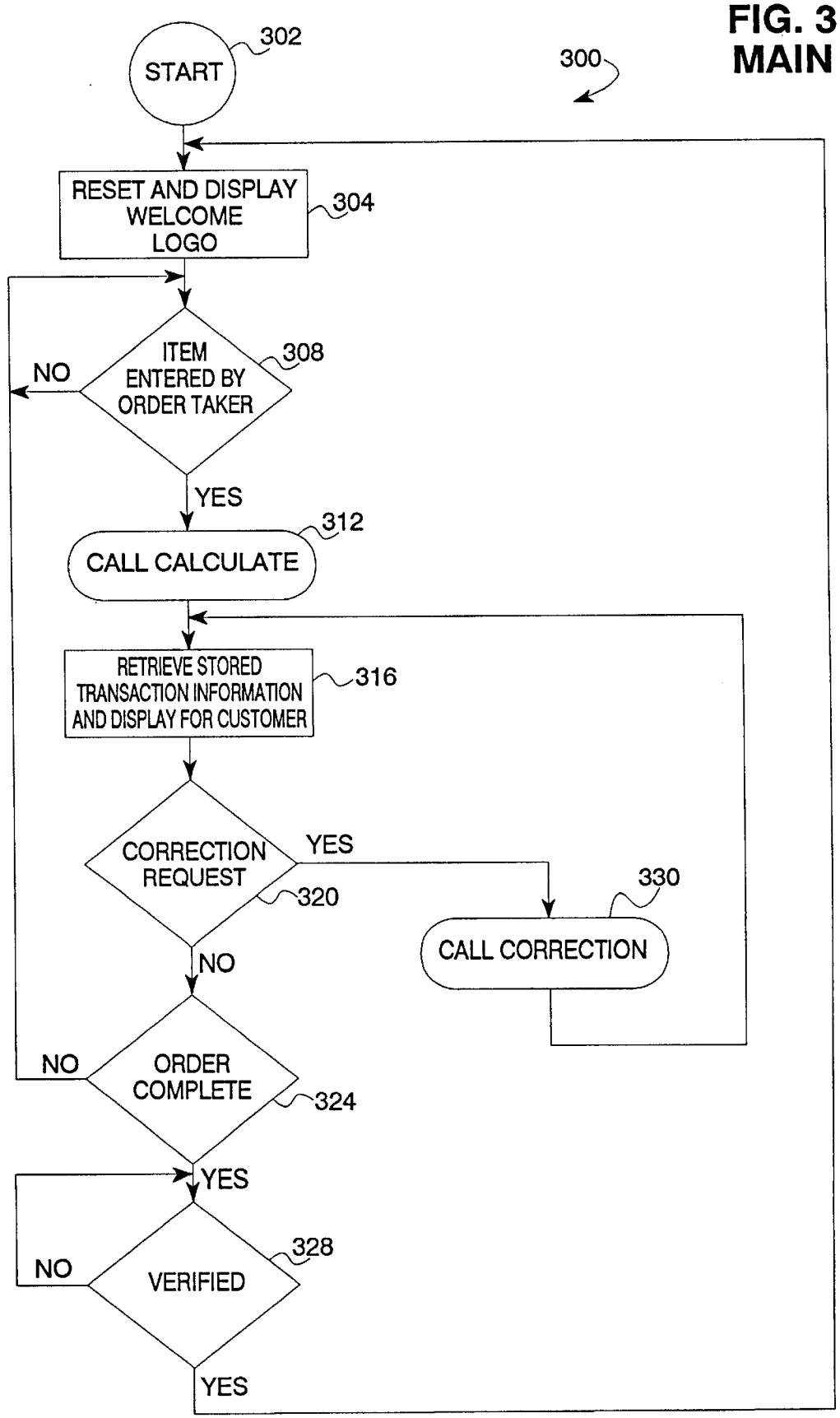
FIGS. 3–5 are flow chart diagrams illustrating various system operations of the video order confirmation system of FIG. 1.

Considering now the point of sale station 24 in greater detail with reference to FIGS. 1–3, the point of sale station 24 generally includes a point of sale system 50 which is coupled between the network interface 26 and a food item keypad register 52. The food item keypad register 52 is arranged with various key pads, such as a key pad 53, each having indicia disposed thereon that corresponds to the various food items that are available from the menu board 12. In this regard, whenever the order taker receives a food order from the customer, the order taker depresses an appropriate one of the keypads that corresponds to the food item selected by the customer. Upon depressing the appropriate keypad, a food item signal is generated that is indicative of the key pad item selected by the order taker in response to the request of the customer. The food item signal, in turn, is coupled to the point of sale system 50 where it temporarily stored until the order taker enters the quantity of the item requested by the customer. Once the quantity information is received, the point of sale system 50 cause a purchase signal 42 to be generated that is coupled to the personal computer 40 via the network interface 26.

As will be explained hereinafter in greater detail, the personal computer 40 responds to the purchase signal 42 by generating a video signal, such as the video signal 43, that is indicative of the item and the quantity of the item selected by the order taker in response to the request of the customer, the unit price of the selected item, and the total price of the item or items selected including any sales tax that must be paid by the customer.

The video signal 43, in turn, is coupled to the display unit 638 which responds to the video signal by displaying the purchase information for verification by the customer. In this regard, should any communication error of order entry error occur relative the food item, its price or quantity of the item selected, the customer can advise the order taker immediately prior to the order being processed and prepared by the other personnel of the fast food restaurant.

Figure 4:
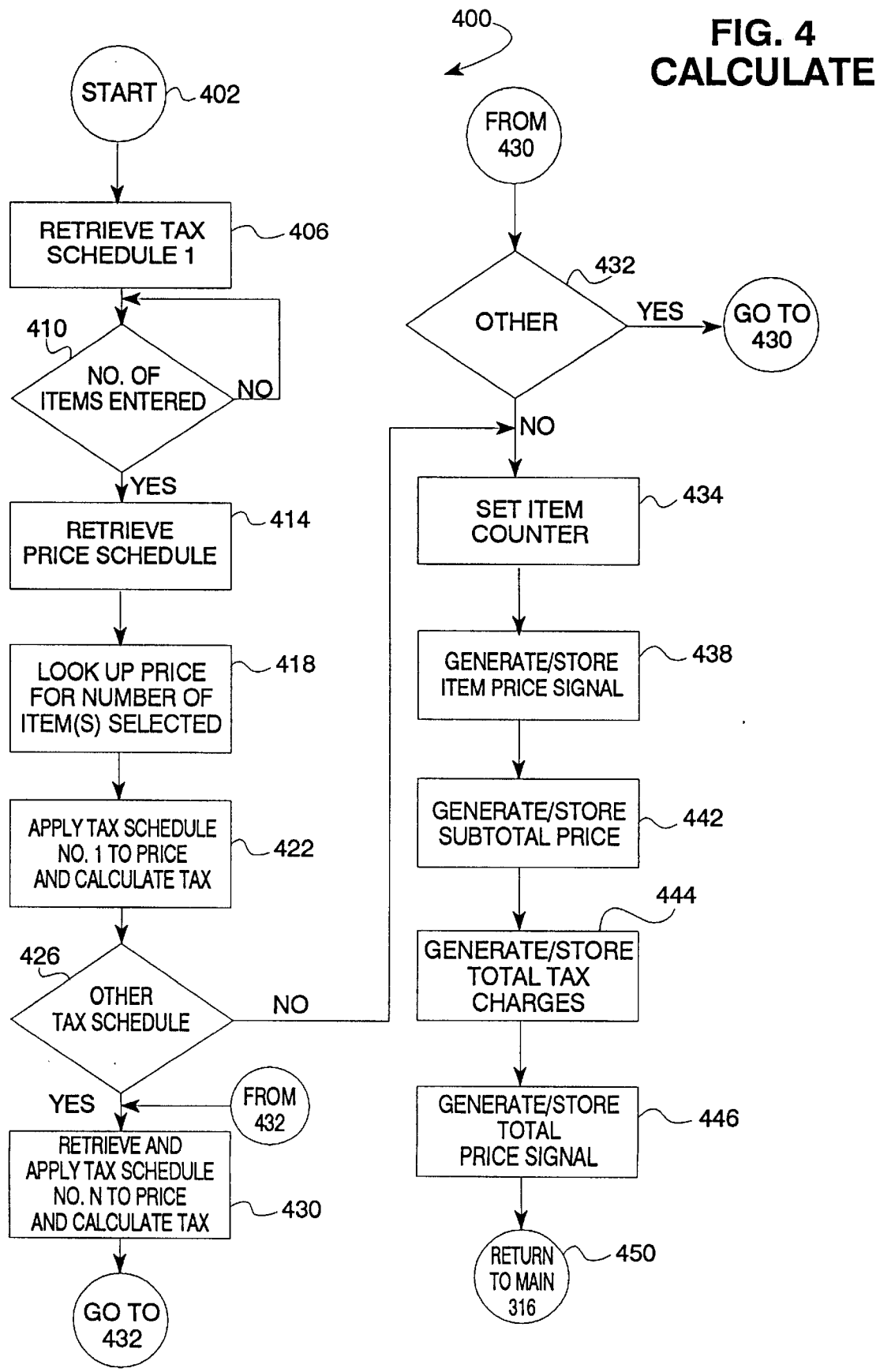

Considering now the operation of the system 10 in greater detail with reference to FIGS. 1 and 4, the system 10 is activated at the beginning of each business day of the fast food restaurant 11. When the system 10 is activated, the pricing information for all the food items listed on the drive-up menu board 12 are downloaded from the personal computer 40 to the point of sale system 50. In this regard, whenever an individual one of the keypads on the food item keypad register 52 is actuated, a resulting order signal 45 will cause the point of sale system 50 to calculate individual item and quantity item prices for the item or items selected and then add the appropriate sales tax for the transaction whether the customer order is a single item transaction or a multi-item transaction.

Once the system 10 has been initialized, the system 10 is in a ready state waiting for the first order to be entered by the order taker.

When a customer arrives at the drive-up video order confirmation station 620, a customer arrival signal is generated by means (not shown) that informs the order taker that a customer has arrived at the order confirmation station 620. The order taker responds to the arrival signal by greeting the customer and then requesting the customer to place his or her food order.

When the customer communicates his or her food order to the order taker via the microphone 634, the order taker responds to the food item request by actuating an appropriate one of the individual keypads on the food item keypad 52. The order taker either requests or confirms the number of the selected food item that the customer desires, and enters the number into the system 10 via the register 52.

Once the order information has been entered, the point of sale system 50 calculates the cost of the item or items requested by the customer as entered by the order taker. In this regard, the point of sale system 50 generates a food order item signal, such as the food order item signal 42 which is coupled to the personal computer 40 via the network interface 26.

The personal computer 40 in turn responds to the order information signal and causes a video information signal to be generated, such as the video information signal 43, which is coupled to the display monitor 638.

The display monitor 638 responds to the video information signal 43 by generating video images indicative of the food item entered by the order taker in response to the request of the customer, as well as the unit price of the item, the purchase price of all the unit items ordered by the customer, and the total price of the order including any taxes that must be payable as calculated by the point of sale system 50.

The customer then views the displayed information on the display 638 to determine whether it reflects accurately the verbal order given to the order taker. The customer can also verify the price of the item or items and the total sales price to determine whether he or she has sufficient cash to pay for the item or items selected.

If the order is correct, the customer and the order taker proceed in a similar manner for each item the customer requests. At the end of the order placing transaction, the display monitor 638 display a screen video image of the correct customer order including the total price the customer must pay when he or she arrives at the drive-up window 13 to pay for and/or pick up the requested order.

If the order is not correct as viewed on the monitor 638, the customer can advise the order taker immediately so the order can be corrected before it is processed and prepared for the customer. Thus, the video order confirmation system 10 greatly facilitates the interactive order taking process both for the customer and the order taker by providing both verbal and visual indications of the food item information the order taker believes the customer desires. In this regard, the system 10 allows the customer to confirm visually whether the order information he or she has communicated to the order taker, is accurate and correct. The video order confirmation system 10 also permits the customer to see the total price of the transaction at all times, commencing with the first food item ordered and ending with the last item ordered so that the entire order transaction can be viewed for accuracy by the customer.

Considering now the drive-up video order confirmation station 620 in still greater detail with reference to FIG. 2, in order to convert the video information signal 43 generated by the personal computer 40 into a video signal for driving the liquid crystal display unit 638, the station 620 includes a display controller 662. The display controller 662 is mounted in the housing 630 and is coupled electrically to the display 638 by a video cable 666.

In order to help facilitate operation of the display 638 in various types of weather conditions, the confirmation station 620 also includes an exhaust or cooling fan 664 and a heating unit 682 having a heater 684 and heater fan 686. The exhaust fan 664 and heater fan 686 cooperate together to help circulate air through the housing 630 under both cold and warm weather conditions. As best seen in FIG. 2, the exhaust fan 664 is coupled to the controller 662 via an exhaust fan cable 658, while the heater 684 and the heating fan 686 are coupled electrically to the controller 662 via a heat control cable 659.

Ambient temperature conditions are monitored by a temperature sensor 687 and temperature sensor circuit 685. The temperature sensor circuit 685 is coupled to the controller 662 via a temperature sensing cable 657.

In order to control the intensity of the video image displayed on the display unit 638, the station 620 also includes a light sensor arrangement 648 which is coupled to the controller 662 via a light sensor cable 656.

Considering now the operation of the system 10 in greater detail with reference to FIGS. 3–5 and 9–10, when the system 10 is powered up, a subroutine MAIN 300 (FIG. 3) is activated. In this regard, the MAIN subroutine 300 advances from a start command 302 to an instruction 304 that resets the internal counters of the point of sale system 50 for order processing purposes and causes the display monitor 638 to display an initial welcome logo (not shown).

Next, the program proceeds to a decision instruction 308 which determines whether the order taker has responded to a customer order request by entering a particular food item via the food item keypad 52. In this regard, if no item has been entered, the program loops at the decision instruction 308 until the order taker initiates an order by activating one of the food item keypads on the keyboard 52.

Once a food item is entered by the order taker, the program goes from the decision instruction 308 to a call subroutine command 312 which causes a CALCULATE subroutine 400 (FIG. 4) to be executed. As will be explained hereinafter in greater detail, the CALCULATE subroutine 400 determines the price of the item or items entered by the order taker in response to the request of the customer, calculates the tax to be charged for the item, determines and stores a subtotal order price, calculates and stores the total taxable charges, and finally, determines and stores total purchase information. The stored transaction information can then be retrieved subsequently for display and verification by the customer.

After the CALCULATE subroutine 400 has been executed, the program advances from the call command 312 to an instruction command 316 which retrieves the calculated and store purchase information generated by the CALCULATE subroutine 400. The instruction command 316 also generates a purchase signal 42 which is coupled to personal computer 40. The personal computer 40 converts the purchase signal 42 into a video signal 43 which is coupled to the display unit 638 to enable the customer to verify visually the order information entered by the order taker.

The program then proceeds to a decision instruction 320 to determine whether the customer has requested any corrections relative to the information displayed on the display unit 638. In this regard, the order taker actuates a correction request via the keypad 52 in response to the customer. If a correction has been requested, the program advances to a call command 330 which causes a CORRECTION subroutine 500 (FIG. 5) to be executed. The CORRECTION subroutine 500 will be described hereinafter in greater detail.

If a correction is not requested, the program proceeds to a decision instruction 324 to determine whether the order taker has actuated a total request indicating the order placed by the customer is now complete.

If the order taker does not activate the total request within a predetermined period of time of about 1 minute, the program returns to the decision command 308 and proceeds as previously described.

Once the order taker has activated the total request keypad, the program advances from the decision command 324 to a verify command 328.

At the verify command 328 the program waits for a verification signal from the keypad keyboard 52. The verification signal is generated by the order taker activating a verified keypad following the verbal confirmation from the customer that the order displayed on the display unit 638 is complete and accurate.

Once the order has been confirmed and verified, the program returns to the instruction command 304 and proceeds as described previously.

Considering now the CALCULATE subroutine 400 in greater detail with reference to FIG. 4, the CALCULATE subroutine 400 begins at a start instruction 402 which is executed in response to the call command 312.

The program advances to an instruction command 406 which causes a tax rate schedule, such as a sales tax rate schedule to be retrieved as downloaded from the personal computer 40.

Next, the program advances to a decision instruction 410 which verifies the unit number of items entered by the order taker. For example, if the customer has requested two orders of french fries, the unit number entered by the order taker is two. The program loops at instruction 410 until the order taker enters the quantity of the item selected for purchase.

Proceeding after the item number has been entered, the program goes to an instruction command 414 which retrieves a price schedule for the item or items selected by the order taker in response to the request of the customer.

Next, the program proceeds to an instruction command 418 which causes a look-up function to be executed so that the price of the total number of unit items selected by the order taker is retrieved and temporarily stored for tax calculation purposes.

The program then advances to an instruction command 422 which determines the tax to be charged for the total number of unit items selected by the order taker. For example, if the customer ordered 3 hamburgers at a unit price of $1.00 each, the program at instruction 418 would look up the price of 3 hamburgers, and then at instruction 422 would apply the retrieved tax schedule rate to the total unit price of $3.00.

Thus, for example, if the tax schedule rate was 10%, the program would perform the calculation illustrated in equation 1.

$$[\text{total unit price}] \times [\text{retrieved tax schedule rate}] = \text{item tax } [(\$1.00 \text{ unit price}) \times (3 \text{ units})] \times [0.10] = \$0.30 \quad (1)$$

After calculating the item tax or taxable charge, the taxable charge is stored and the program advances to a decision instruction 426 which determines if any other tax rate schedules should be applied to the sales item transaction. In this regard, if another tax rate schedule is to be applied, the program advances to an instruction 430 which retrieves the next tax rate schedule, calculates the next taxable charge and stores the calculated tax. The program then advances to a decision instruction 432 to determine whether any other tax rate charges need to be applied to the transaction. If so, the program returns to instruction 430 and proceeds as previously described. If not, the program advances to an instruction command 434 which sets an initial item counter in the point of sales system 50 for helping to identify the item ordered by the customer should a subsequent correction be required.

At decision instruction 426, if a determination is made that no other taxes are to be charged against the item selected, the program goes directly to the instruction command 434.

After the item counter is set at instruction 434, the program goes to an instruction command 438 which generates and stores the item price. In this regard, the item price information is determined according to equation 2:

$$\text{item price} = (\text{unit price} \times \text{total units}) \quad (2)$$

After calculating and storing the item price, the program proceeds to an instruction 442 which adds the item price to the previously stored, if any, total item price charges to provide a substantial price according to equation (3):

$$\text{prevously stored total item transaction prices} + \text{item price} = \text{new total transaction price} = \text{subtotal price} \quad (3)$$

Next, the program goes to an instruction 444 which adds item tax to the previously stored, if any, total tax charges to a given total tax according to the equation (4):

$$\text{prevously stored total item taxes} + \text{item tax} = \text{new total tax charges} \quad (4)$$

The program then advances to an add command instruction 446 which causes the sum of equation (3) and equation (4) to be added together to give a total transaction price according to equation (5):

$$\text{subtotal price} + \text{new total tax charges} = \text{total transaction price} \quad (5)$$

The subtotal price, new total tax charges and total transaction price are each stored as calculated for later retrieval by the computer 40 for display purposes as will be explained in greater detail.
the new total transaction price to be stored replacing the previously stored total transaction price. The program then returns to the MAIN subroutine 300 at instruction 316 and proceeds as described previously.

Figure 5:
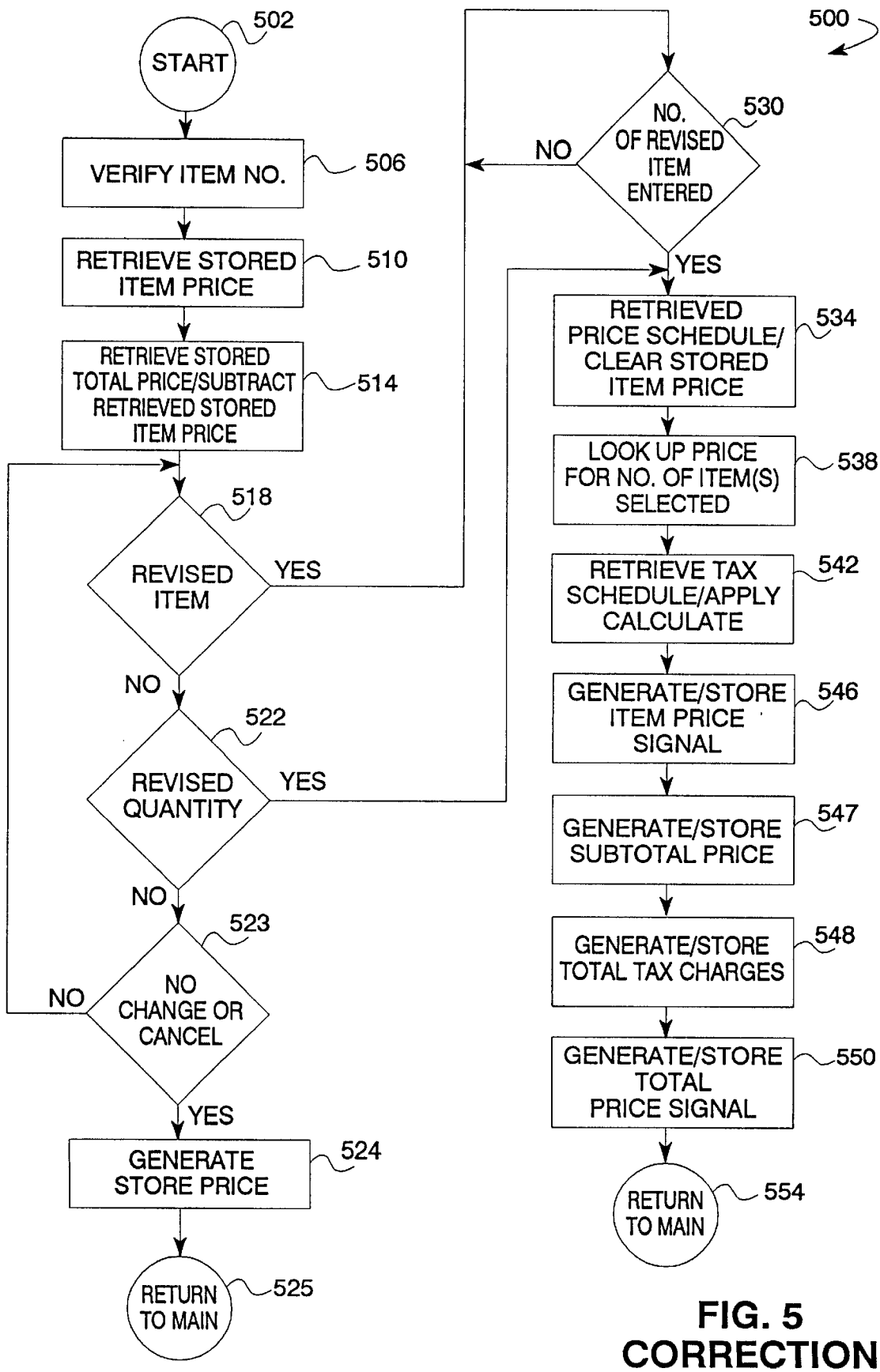

Considering now the CORRECTION subroutine 500 in greater detail with reference to FIG. 5, the CORRECTION subroutine 500 begins at a start instruction 502 which is initiated by the call command 330 from the MAIN program 300.

From the start command 502, the program advances to an instruction command 506 to verify the item number of the order that requires correction. In this regard, the item number will be the order item most recently displayed for verification by the customer.

Should an earlier item ordered require correction, the order taker via a keypad on the keypad keyboard 52, can enter an item number.

After verifying the item number requiring correction, the program proceeds to an instruction command 510 which retrieves the item price for the determined item.

Next, the program advances to an instruction command 514 which retrieves the stored total price and causes the previously retrieved item price, including any item taxes, to be subtracted from the total. The program then goes to a decision command 518 which determines whether a revised item has been entered by the order taker.

If no revised item has been entered, the program advances to a decision instruction 522 to determine if a quantity correction was entered.

If no revised item or quantity corrections have been requested, the program advances from the decision instruction 522 to a decision instruction 523 to verify whether the item or the order has been cancelled. In this regard, if no change has been indicated via the order taker making an appropriate subsequent entry from the food item keypad 52, the program will loop between instructions 518, 522 and 523, until the order taker makes such an entry.

In the event the order taker has indicated the item or the order is to be cancelled, the program advances from the decision instruction 523 to a command instruction 524 which causes a new total price signal to be generated and stored for customer verification purposes. In this regard, if the item has been cancelled, a new total price will be displayed on the display unit 38 that does not include the deleted item. Alternately, if the order has been cancelled, the total price signal generated is indicative of no charges as all items ordered will automatically be deleted by the generate command 524 of the CORRECTION subroutine 500.

From instruction 524, the program goes to a return command 525 which returns the program to the MAIN subroutine 300.

Considering again the revised item decision instruction 518, if the order taker has indicated a revised item has been requested by the customer, the program proceeds to a decision instruction 530 which determines whether the order taker has entered a quantity indication for the revised item. If no quantity has been indicated via the food item keypad 52, the program loops at instruction 530 until the order taker provides the quantity information.

Once the order taker has provided the quantity information for the revised item, the program goes to an instruction 534 which causes the price schedule for the revised item to be retrieved. Also, the command 534 causes the previously stored item price to be cleared.

The CORRECTION subroutine 500 at decision instruction 522 will also advance to the retrieve command 534 if the order correction only pertains to a quantity correction.

From instruction 534, the program advances a lookup instruction 538 that causes the price of the unit number of the item selected to be determined from the retrieved price schedule.

Next, the program advances to a retrieve instruction 542 which causes the approval tax rate schedules to be retrieved and applied to calculate the new tax or taxes to be added to the price of the item or items ordered as shown previously in FIG. 4.

Once the tax has been determined, the program goes to a command instruction 546 which generates and stores the revised item price. The program then proceeds to a command instruction 547 which causes a new subtotal price to be generated and stored. The program continues to update the displayed information by proceeding to a command instruction 548 which causes a new total tax to be calculated and stored. The program then proceeds to a command instruction 550 which generates and stores the new total price.

Once the correction to the item or order has been completed, the program goes from the instruction 550 to a return command 554 which returns the program to the MAIN subroutine 300.

From the foregoing, it should be understood the process of correction involves the same basic steps of adding a new item to the customer's order.

Referring now to FIGS. 10–12, a series of display screens 1000, 1100, and 1200 are illustrated that provide a more detailed description of a typical order process.

In this regard, as best seen in FIG. 10, a customer in process of placing an order, has ordered various food and drink items illustrated by the following images displayed on the display 638: A hamburger food order image 1002 indicative that the customer had ordered a single hamburger at a price of $1.60; a potato food order image 1004 indicative that the customer has ordered a single order of fries at a price of $0.80 and a drink order image 1006 indicative that the customer has ordered two soft drinks at a price of $2.60.

In order to provide complete information relative to the in process customer order, the screen 1000 further includes a subtotal price image 1008 which is indicative of a subtotal price of the total unit prices of all the food and drink items ordered by the customer; a total tax image 1009 indicative of the total taxes to be charged against the total food order and a total price image 1010 indicative of the total price the customer must pay if the order is completed.

As best seen in FIG. 11, the monitor 638 has a modified screen 1100 where the customer has continued with the order in process as illustrated by FIG. 10 by including an additional drink item, a vanilla shake. In this regard, the screen 1000 has been updated by the computer 40 to the new screen 1100 which now includes an additional drink image 1107 indicative of the ordered vanilla shake and its price of $1.30, the previous order items are regenerated by a set of images, such as images 1102, 1104 and 1106, respectively. The previous subtotal, tax and total price images 1008–1010 respectively of FIG. 10, have been revised to provide a new subtotal image 1108, a new total tax image 1109, and a new total price image 1110.

After reviewing the image information displayed on screen 1100, the customer realizes that a correction to the order is required. In this regard, the customer instructs the order taker that two orders of fries are required and only 1 soft drink is needed. The order taker enters corrected information for the new items and a correction screen 1200 as shown in FIG. 12 is displayed for the customer.

The screen 1200 includes a pair of corrected images 1204 and 1206 respectively, a revised potato order image 1204 and a revised drink order image 1206. In addition, the previously displayed subtotal, tax, and total price images 1108–1110, respectively of FIG. 11 have also been revised to provide another new subtotal image 1208, another new total tax image 1209, and another new total price image 1210.

The customer verifies visually that the new information is displayed on screen 1200 is correct and so informs the order taker. Thus, the verification process is completed.

Figure 8B:
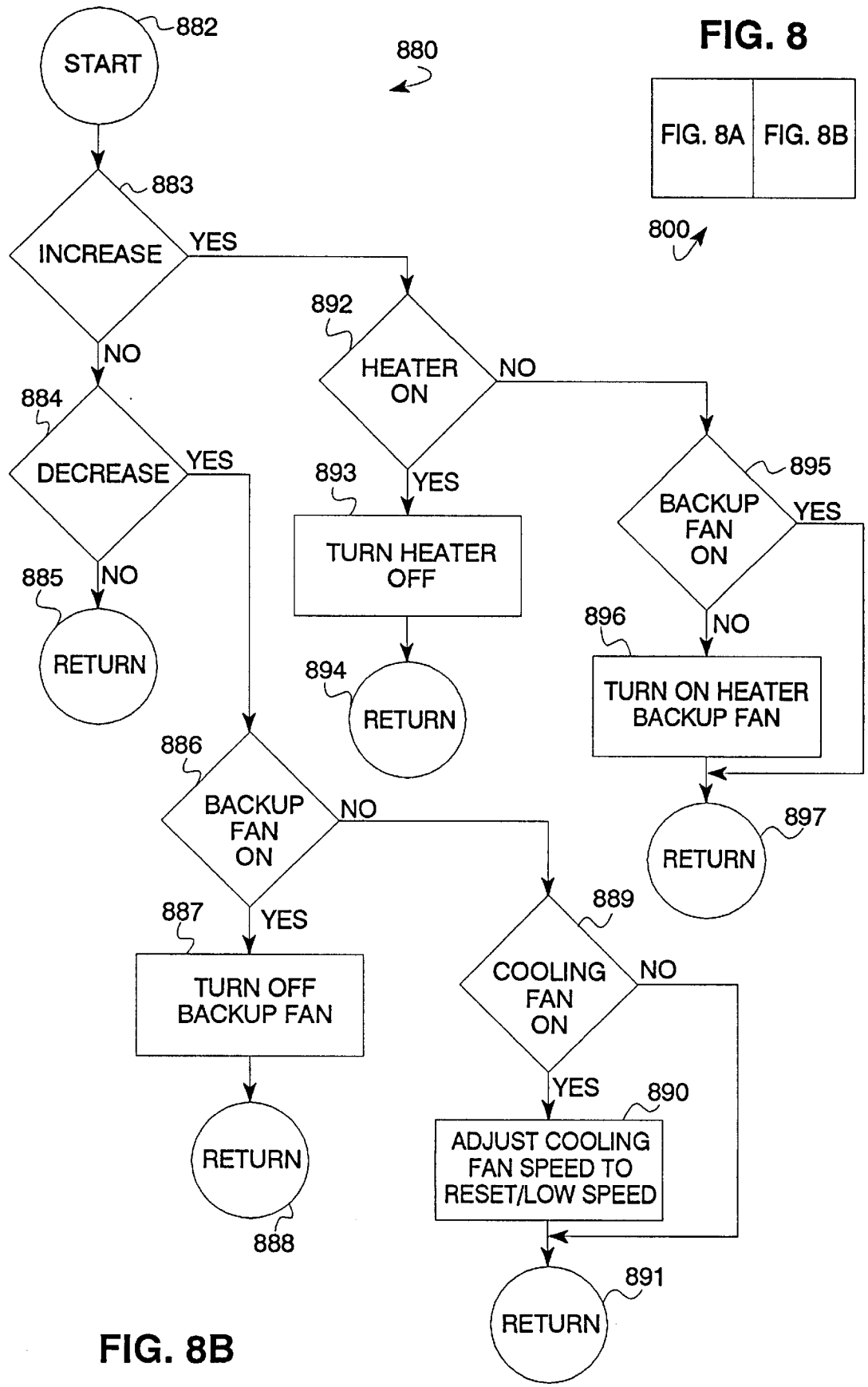
FIGS. 8–9 are flow chart diagrams of respective temperature and light control system operations of the video order confirmation system of FIG. 1.

Considering now a TEMPERATURE DETECT subroutine 800 in greater detail with reference to FIG. 8, the TEMPERATURE DETECT subroutine 800 is commenced whenever power is applied to the system 10. In this regard, the TEMPERATURE DETECT subroutine advances from a start command 802 to a read/store instruction command 810 which causes the current temperature as detected by the temperature sensor 687 to be read and stored temporarily by the controller 662.

The program then advances to a compare instruction command 820 which causes a previously stored temperature to be compared with the current temperature. In this regard, an internal register within the controller 62 is initially reset to a value indicative of a midrange optimum temperature of about 0 degrees Centigrade. Thereafter, as will be described in greater detail, the most current temperature read and stored will replace the previously stored temperature value each time the TEMPERATURE DETECT subroutine 800 is executed.

Next, the program proceeds to a decision instruction 830 which determines whether a temperature increase has occurred relative to the previously stored temperature. If there has been a temperature increase, the program proceeds to a decision instruction 832 which determines whether the current temperature is within an optimum temperature range of between about 0 degrees Centigrade and about minus 10 degrees Centigrade.

If there has not been a temperature increase determined at decision instruction 830, the program goes to a decision instruction 840 which determines whether there has been a decrease in temperature. The decision instruction 840 will be described hereinafter in greater detail.

At decision instruction 832, as mentioned earlier, a determination is made whether the current temperature is within the optimum temperature range. If a determination is made that the temperature is within the optimum range, the program advances to a call command 833 which causes a FAN ADJUST subroutine 880 to be executed. The FAN ADJUST subroutine 880 will be described hereinafter.

At instruction 832, in order to control the operation of the primary cooling or circulation fan 664 and the backup or heater fan 686 for optimum temperature control, the program proceeds from the decision instruction 832 to another decision instruction 834 whenever the current temperature falls outside the above-mentioned optimum temperature range. At decision instruction 834, the program determines whether the cooling fan 664 has been previously activated to a high speed of operation. In this regard, when the system 10 is initially started, the cooling fan 664 is set to a low operating speed setting to allow a small flow of circulation air to flow through the housing 630.

If it is determined at instruction 834 that the cooling fan 664 has not been set to a high speed setting, the program goes to an instruction command 836 which causes the fan 664 to be set to a high speed setting. The fan speed is increased as the current temperature is not within the optimum range and there is an indication that the detected temperature is increased from the previously detected and stored temperature value.

Next, the program advances to a wait instruction command 838 which causes the program to wait for a fixed period of time t for temperature stabilization purposes.

After the time out period t has elapsed, the program proceeds from the unit command 838 to a store instruction 842 which causes the previously stored temperature value to replace the current temperature value. The program then goes to a return instruction 846 which returns the program to instruction 810 where the program proceeds as previously described.

Should the program determine at decision instruction 834 that the cooling fan 664 was previously set to a high speed operation setting, the program goes to a decision instruction 850 as opposed to instruction 836. At decision instruction 850 a determination is made as to whether the backup or heater fan 686 has been activated to help increase the air flow through the housing 630. In this regard, the backup fan 686 can be activated independently on the heater 684 and thus, the backup fan 686 can be utilized to help increase air flow for cooling purposes.

If the backup fan 686 has not been activated, the program goes to an instruction command 852 which causes the backup fan 686 to be activated. From instruction 852, the program advances to instruction 838 and proceeds as described previously.

If a determination is made at decision instruction 850 that the backup fan 686 was already activated, the program proceeds to a decision instruction 854 which determines whether the current temperature reading is indicative of a temperature within a maximum temperature shutdown range of about 50 degrees Centigrade and about 45 degrees Centigrade.

If the temperature is within the shutdown range, the program goes to a decision instruction 856 which determines whether the current temperature is equal to or greater than the shutdown temperature of about 51 degrees Centigrade.

At instruction 856, if it is determined the current temperature value does not exceed or equal the shut down temperature value, the program goes to the instruction 838 and proceeds as described previously.

At instruction 856 if it is determined the current temperature value does equal or exceed the shutdown temperature relay the program advances to a command instruction 857 which causes the system 10 to be deactivated because of an excessive temperature condition. Command instruction 857 also causes an alarm indication to be provided to the personnel within the fast food restaurant 11 so that corrective action, if any, can be taken.

Once the alarm has been provided, the program proceeds to an exit or end command 859 ending the subroutine 800 due to system shutdown.

Considering now the decision instruction 840 in greater detail with reference to FIG. 8, if a determination is made at decision instruction 840 that the current temperature is decreasing from the temperature value stored previously (or a reset value if the temperature value has not been determined and stored previously) the program advances to a decision instruction 848 to determine if the current temperature value is within the optimum range.

If the current temperature value is within the optimum range, the program goes to the call instruction 833 that calls the FAN ADJUST subroutine 880 that will be described hereinafter in greater detail. The FAN ADJUST subroutine 880 is an integral part of the TEMPERATURE DETECT subroutine 800 and functions to control the operating speeds of the backup fan 686 and the cooling fan 664 for optimum temperature control purposes.

At decision instruction 848, if a determination is made that the temperature has decreased and has fallen outside or below the optimum temperature range, the program goes to a decision instruction 880 which determines whether the heater 684 and the heater or backup fan 686 have been activated. If the heater 684 and the heater fan 686 have not been activated, the program advances to an instruction command 865 which causes the heater 684 and the heater fan 686 to be activated.

The program then advances to a return command 869 which causes the program to return to the beginning of the subroutine at instruction 810.

If the heater 684 and the heater fan 686 have been activated, the program goes to a decision command 862 which determines whether the current temperature has decreased to a temperature value within a minimum temperature shutdown range of about minus 35 degrees Centigrade and about minus 40 degrees Centigrade.

When the current temperature is not within the critical shutdown range, the program goes to the instruction 838 and proceeds as described previously.

When the current temperature is within the critical shutdown range, the program goes to a decision instruction 864 which determines whether the current temperature equals or has fallen below the minimum shutdown temperature value of about minus 41 degrees Centigrade. If so, the program goes to the shutdown command 857 and proceeds as described previously. If not, the program goes to the wait instruction 838 and proceeds as described previously.

Considering now the FAN ADJUST subroutine 880 in greater detail with reference to FIG. 8, the FAN ADJUST subroutine 880 begins at a start instruction 882 and proceeds to a decision instruction 883 which determines whether the current temperature is an increased temperature over the temperature stored previously.

If the temperature is within the optimum temperature range but is increasing, the program proceeds from decision instruction 883 to a decision instruction 892 to determine whether the heater 684 is activated.

If the temperature is within the optimum temperature range but is not increasing, the program goes to decision instruction 884 which determines if the temperature is decreasing. If not, the temperature is stable within the optimum range and the program goes to a return command 885 returning to the TEMPERATURE DETECT subroutine 800 at the wait instruction 838 and proceeds as described previously.

At decision instruction 892, it is determined whether the heater 684 is on and if so, the program advances to a command instruction 893 which causes the heater 84 to be deactivated. In this regard, the temperature is within the optimum range, but is increasing and thus, energy may be conserved by deactivating the heater 684.

After the instruction 893 is executed, the program advances to a return command 894 which cause the program to return to the TEMPERATURE DETECT subroutine 800 at instruction 838 where the program continues as described previously.

At decision instruction 892, if it is determined that the heater 684 is deactivated, the program advances to a decision instruction 895, which determines whether the backup heater fan 686 is activated. If the heater 684 is deactivated, the program advances to a command instruction 896 which causes the backup fan 686 to be activated. In this regard, the backup fan 686 may be activated to help stabilize the temperature which is increasing.

After the backup fan 686 has been activated, the program goes to a return instruction 897 which returns the TEMPERATURE DETECT subroutine at instruction 838 where the program proceeds as described previously.

If at decision instruction 895 it is determined that the backup fan 686 is activated, the program goes to the return instruction 897 which returns the TEMPERATURE DETECT subroutine at instruction 838 where the program proceeds as described previously.

Figure 9:
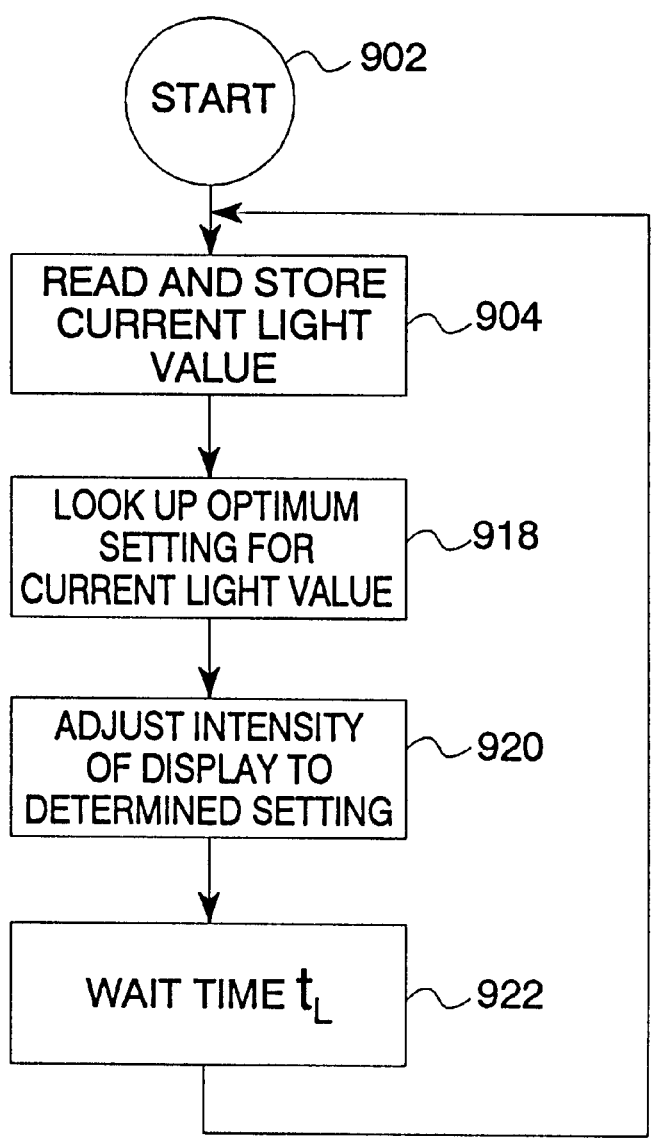

Considering a the LIGHT DETECT subroutine 900 in greater detail with reference to FIG. 9, the LIGHT DETECT subroutine 900 commences at a start command 902 whenever the power is applied to the system 10.

The program advances from the start command 902 to a read and store command instruction 904 that cause the current light value signal from the light sensor arrangement 48 to be read and stored by the computer 62.

Next, the program proceeds to a lookup command instruction 918 which causes the computer to look up in a prestored table an optimum intensity level setting for the display monitor 638 relative to ambient light conditions.

The program then advances to an adjust command instruction 920 which adjusts the intensity level of the display monitor to the optimum setting value retrieved from the look up table.

After adjusting the intensity level setting, the program proceeds to a wait command instruction 922 that allows a sufficient period of time $t_2$ to elapse before determining whether another intensity level adjustment should be made. The time $t_2$ is about between 60 minutes and about 5 minutes. A more preferred time is between about 30 minutes and about 10 minutes, and the most preferred time $t_2$ is about 15 minutes.

The program then returns to instruction 904 and continues as described previously.

Figures 6, 6A:
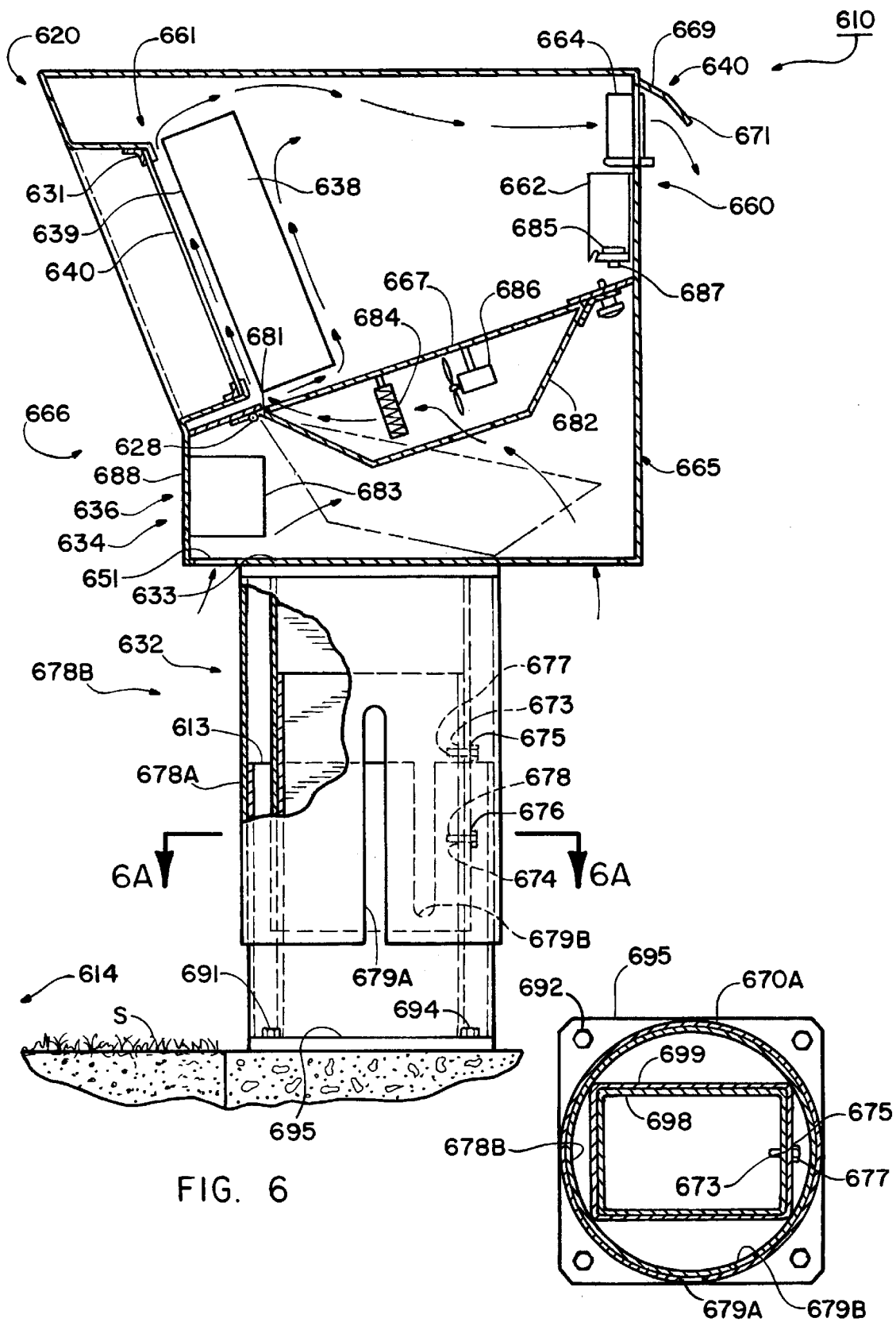
FIG. 6 is a cross sectional cut away view of a drive-up video order confirmation station of FIG. 1.
FIG. 6A is a cross sectional view of a pedestal support of FIG. 6 taken substantially along lines 3—3.

Considering now the drive-up video order confirmation station 620 in still greater detail with reference to FIG. 6, the housing 630 is a generally irregularly shaped box like hollow structure, having an upper portion 660 and a lower portion 680.

The upper portion 660 receives and supports therein a video display monitor 638, a video display controller 662, and a cooling or exhaust fan unit 664. The video display controller 662 is coupled electrically between the monitor display unit 638 and a personal computer 640, and responds to the video information signals generated by the display controller 662. In this regard, the controller 662 converts the video information signals generated by the computer 640 into display signals to cause the monitor 638 to display the video images indicative of the order information entered by the order taker and requested by the customer.

In the preferred form of the present invention, the monitor display unit 638 is a liquid crystal display panel monitor. However, those skilled in the art will understand that other types of display units, such as cathode ray tube may also be employed.

The upper portion 660 of the housing 630 also receives and supports on a rear wall member 663, the exhaust fan 664 that causes air passing through the housing 630 to be exhausted to the outside atmosphere. A splash guard shield 669 mounted to the exterior of the upper portion 660 at about a back wall member 665 of the housing 630, helps to prevent rain and other forms of moisture from entering the hollow interior of the housing 630.

The splash guard shield 669 includes an upper panel member 670 and an integrally connected lower panel member 671. The lower panel member 671 is disposed angularly downwardly from the upper member 670 so that the exhaust air exiting the housing 630 is directed downwardly after striking both the upper member 670 and the lower member 671. Such an angular arrangement between the upper member 670 and the lower member 671 causes the exhaust air to be directed downwardly across the back wall member 665. In this manner, the fan 664 and the guard shield 669 cooperate together to help direct the exhaust air down the back wall member 665, which in turn, helps to maintain the air temperature within the housing 630 at an acceptable operating temperature level during cold weather conditions.

In order to help heated air to be directed across the front face of the liquid crystal display unit 638 under cold weather conditions, an air duct arrangement, indicated generally at 666 is mounted partially within the upper housing portion 660 and the lower housing portion 680. In this regard, the duct arrangement 666 is disposed in atmospheric communication with a hollow heater pan 682, having a heater 684 and a heater fan 686 mounted therein.

The heater pan 682 is pivotally mounted to a bottom wall member 667 of the upper portion 660 that functions in cooperation with the heater pan 682 as part of the duct arrangement 666. The heater pan 682 allows the accumulation of heated air warmed by the heater 684 and the heater fan 686 facilitates the moving of the heated air along the duct 666 and across the face of the display unit 638.

The heater pan 682 is pivotally mounted by a hinge 688 that extends along a front edge portion of the pan 682. In this regard, when the heater pan 682 is pivoted downwardly to an open position, it comes to rest on a bottom wall member 689 of the lower portion 680.

Considering now the upper portion 680 in still greater detail, an opening 681 in the bottom wall member 667 allows the heated air in the heater pan 682 to escape from the pan 682 and to be directed in an angularly upwardly directed path 661 that extends from the bottom wall member 667 to a top wall member 668 of the upper portion 660. The path 661 is disposed adjacent to the face 639 of the display unit 638, and thus, the heated air traveling along the path 661 helps prevent the liquid crystal material of the display 638 from freezing under server cold weather conditions.

Considering now the display unit 638 in greater detail, the display unit 638 is mounted at about forwardly from the horizontal at about an angle of 20 degrees from the vertical. In this regard, the face 639 of the display unit 638 is tilted downwardly to help reduce glare on the screen face 639 in bright sunny conditions. Thus, viewing of the liquid crystal images on the display unit 638 is made more convenient and easier due to elimination of the glare. A transparent screen guard 640 is secured to a front portion 631 of the housing 630 to further help protect the display unit 638 under severe weather conditions.

Considering now the bottom portion 680 in greater detail with reference to FIG. 6, the bottom wall member 689 is mounted to a top portion 633 of the pedestal 632. In order to allow atmospheric air to enter the housing 630, the bottom wall member 689 has a pair of air inlets 651 and 652 which enable air to enter within the housing 630 for air circulation purposes.

The bottom portion 680 also includes a front wall member 688 having a speaker/microphone compartment 683 mounted thereto. The microphone 634 and the speaker 636 are mounted spaced apart, within the compartment 683 to facilitate full duplex communication with a customer in the drive up lane 614.

Considering now the pedestal 632 in greater detail, the pedestal 632 includes a base member 695 that is mounted by a set of bolts, such as bolts 691–694 to a concrete slab S. An inner pedestal member 698 is integrally connected to the base member 695 and functions as a stationary support for an outer pedestal member 699 as will be explained hereinafter.

In order to enable the pedestal stand 632 to be adjustable, the pedestal member 698 is complementary in shape to the outer pedestal member 699 and includes a series of spaced apart threaded adjustment holes, such as the holes 673, and 674. A similar set of threaded holes, such as the holes 675 and 676, are disposed in the outer pedestal member 699. The outer pedestal 699 is mounted slidingly on the inner pedestal 698. In this regard, the housing 630 secured to the outer pedestal 699 can be raised and lowered relative to the inner pedestal 698 for height adjustment purposes.

Thus, the height of the outer pedestal 699 can be adjusted relative to the height of the inner pedestal 698.

Once the height of the outer pedestal 699 has been adjusted, a set of height holding screws 677 and 678 can be aligned with selected ones of the height adjustment holes to cause the outer pedestal member 699 to be mounted at a desired height relative to the inner pedestal member 698.

In order to facilitate an aesthetic appearance to the station 620, the pedestal 632 also includes a pair of generally circular rotatably mounted shrouds or cover members 678A and 678B each having an elongated adjustment slot 679A and 679B respectively. The slots 679A and 679B allows adjustment of the holding screws 677 and 678 as required.

Considering now the video display controller 662 in greater detail with reference to FIG. 6, the video display controller 662 includes a temperature sensor circuit 685 and a temperature sensor 687 that detects the ambient temperature. In this regard, whenever the ambient temperature falls outside a desired operating arrange, the temperature sensor circuit 685 will cause either the cooling fan 664 to be activated or the heater 684 and heating fan 686 to be activated, depending upon the detected air temperature. In this regard, the desired operating range is between about minus 40 degrees C. to plus 50 degrees C. As the previously described system 10 includes a similar sensor 87 and circuit 85, they will not be described in greater detail.

Figures 7, 7A:
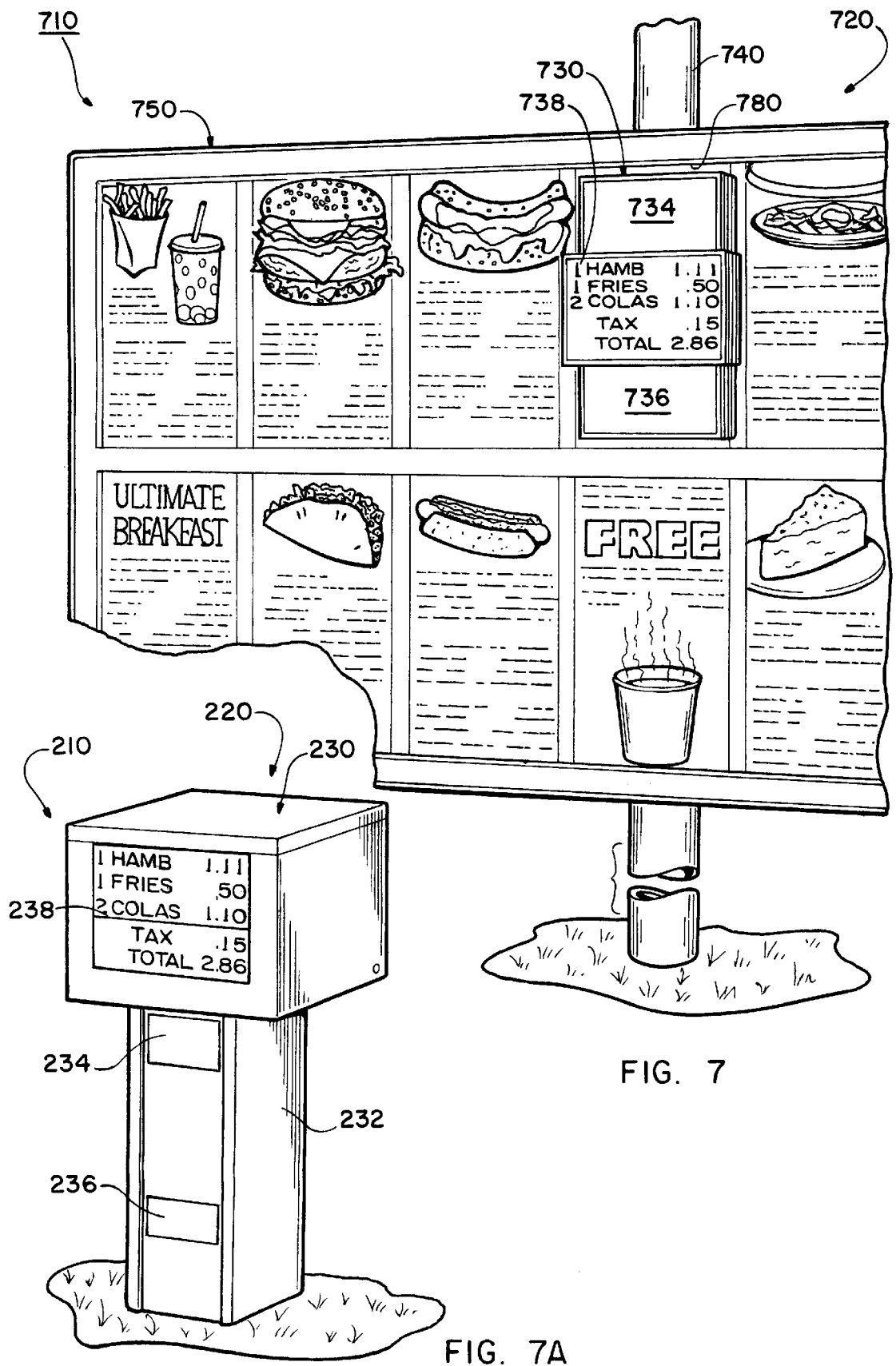
FIG. 7 is a pictorial view of another drive-up video order confirmation system, which is constructed in accordance with the present invention.
FIG. 7A is a pictorial view of another drive-up video order confirmation system, which is constructed in accordance with the present invention.

Referring now to the drawings and more particularly to FIG. 7, there is illustrated a video order confirmation system 710 which is constructed in accordance with the present invention.

The video order confirmation system 710 is substantially identical to the video order confirmation system 10 except for the construction of the video order confirmation station 720. As the station 720 is only difference, only station 720 will be described in greater detail.

Considering now the drive-up video order confirmation station 720 in still greater detail with reference to FIG. 7, generally includes a menu board mounting pole 740, a light emitting diode menu board 750 and an order verification unit 730 having a speaker 734, microphone 736, and light emitting diode display unit 738 mounted therein. An opening in the menu board 750 indicated generally at 780 is dimensioned to receive therein the order unit 730 which is mounted to the pole 740 by means not shown. It should be understood by those skilled in the art that other types of display units, such as a cathode ray tube display or a liquid crystal panel display can also be employed.

The microphone 736 is mounted from the vertical with its face disposed downwardly angularly from the vertical to help prevent unwanted and undesired feedback interference during full duplex communications. The speaker 734 is mounted with its face disposed parallel to the vertical.

Although the speaker 734 is illustrated mounted above the microphone 736, it should be understood by those skilled in the art that the microphone may be mounted above and spaced apart from the speaker. Also, in such alternate mounting arrangements, the microphone may also be inclined angularly upwardly from the vertical with the speaker mounted parallel to the vertical to help prevent feedback interference.

Referring now to the drawings and more particularly to FIG. 7A, there is illustrated a video order confirmation system 210 which is constructed in accordance with the present invention.

The video order confirmation system 210 is substantially identical to the video order confirmation system 10 except for the construction of the video order confirmation station 220. As the station 220 is the only difference, only station 220 will be described in greater detail.

Considering now the drive-up video order confirmation station 220 in still greater detail with reference to FIG. 7A, generally includes a stand alone housing 230 which is mounted on an adjustable pedestal 232 that is disposed in close proximity to a drive-up lane (not shown). An upper microphone unit 234 and a lower speaker unit 236 are mounted spaced apart from one another in the housing 230 to enable the customer to give his or her food order verbally to the order taker and to enable the customer to hear verbal communications from the order taker or other personnel from within the restaurant.

Although the microphone unit 234 is illustrated as mounted above the speaker unit 236, those skilled in the art will understand the mounting arrangement can be reversed with the speaker unit mounted above the microphone unit. In this regard, it should be understood that the separation between the microphone unit 234 and the speaker unit 236 is an important feature in order to help reduce, if not eliminate completely feedback from the speaker 236 into the microphone 234 during full duplex communications.

In order for the customer to confirm his or her order visually, a display monitor such as a cathode ray tube display monitor 238 is mounted within the housing 230. It should be understood by those skilled in the art that other types of display units, such as a liquid crystal panel display or a light emitting diode display can be employed.

The microphone 236 is mounted from the vertical with its face disposed downwardly angularly from the vertical to help prevent unwanted and undesired feedback interference during full duplex communications. The speaker 234 is mounted with its face disposed parallel to the vertical.

Although the speaker 234 is illustrated mounted above the microphone 236, it should be understood by those skilled in the art that the microphone 236 may be mounted above and spaced apart from the speaker 234. Also, in such alternate mounting arrangements, the microphone 236 may also be inclined angularly upwardly from the vertical with the speaker 234 mounted parallel to the vertical to help prevent feedback interference.

Figure 13:
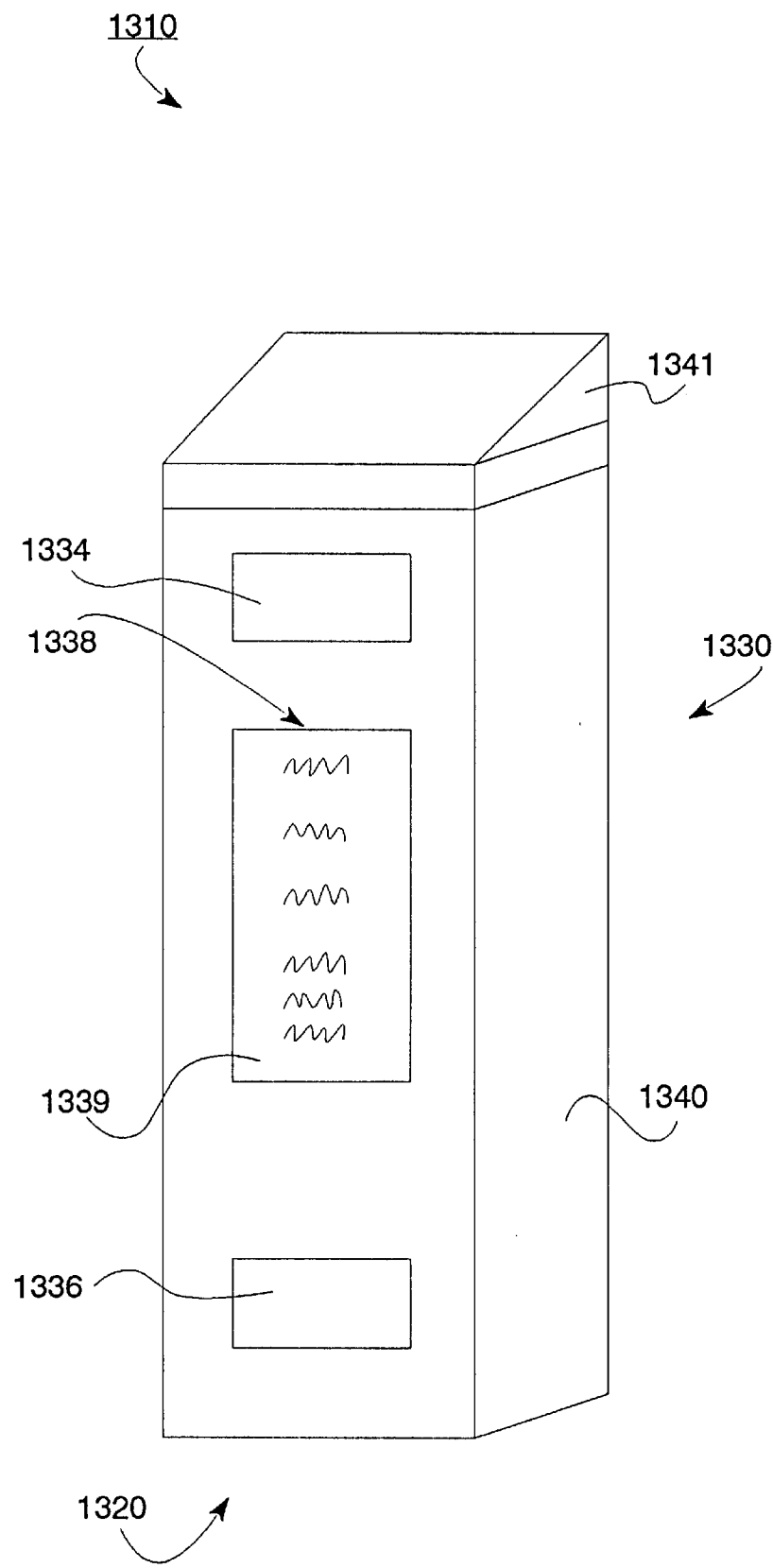
FIG. 13 is a pictorial view of another drive-up video order confirmation system, which is constructed in accordance with the present invention.

Referring now to the drawings and more particularly to FIG. 13 thereof, there is illustrated a video order confirmation system 1310 which is constructed in accordance with the present invention.

The video order confirmation system 1310 is substantially identical to the video order confirmation system 10 except for the construction of the drive up video order confirmation station 1320. As the station 1320 is the only difference, only station 1320 will be described in greater detail.

Considering now the drive-up video order confirmation station 1320 in greater detail with reference to FIG. 13, the station 1320 generally includes a stand alone housing 1330 that is disposed in close proximity to a drive-up lane (not shown).

An upper microphone unit 1334 and a lower speaker unit 1336 are mounted spaced apart from one another in the housing 1330 to enable the customer to give his or her food order verbally to the order taker and to enable the customer to hear verbal communications from the order taker or other personnel from within the restaurant. The speaker 1334 and microphone 1336 provides full duplex communication allowing simultaneous two-way communication.

Although the microphone unit 1334 is illustrated as mounted above the speaker unit 1336, those skilled in the art will understand the mounting arrangement can be reversed with the speaker unit mounted above the microphone unit. In this regard, it should be understood that the separation between the microphone unit 1334 and the speaker unit 1336 is an important feature in order to help reduce, if not eliminate completely feedback from the speaker 1336 into the microphone 1334 during full duplex communications.

The microphone 1334 is mounted from the vertical with its face disposed upwardly angularly from the vertical to help prevent unwanted and undesired feedback interference during full duplex communications. The speaker 1334 is mounted with its face disposed parallel to the vertical. Also, in such alternate mounting arrangements, the microphone 1334 may also be inclined angularly downwardly from the vertical with the speaker 1336 mounted parallel to the vertical to help prevent feedback interference.

In order for the customer to confirm his or her order visually, a display monitor 1338 is mounted within the housing 1330 between the microphone unit 1334 and the speaker unit 1336. In the preferred form of the present invention, the display monitor 1338 is a liquid crystal display monitor having a liquid crystal display panel 1339.

The display monitor 1338 utilizes reflective display technology for high visibility in direct sunlight. The liquid crystal display panel 1339 is impact-resistant and is coated with an anti-glare protective coating to provide optimum viewing of orders in various levels of light. The liquid crystal display panel 1339 is also back-lit making the liquid crystal display images visible in little or no light conditions.

The housing 1330 includes a base member 1340 and a top member 1341. The speaker 1334, microphone 1336 and monitor 1338 are mounted in the base member 1340 which is generally rectangularly shaped. The top member 1341 is wedge shaped giving the housing 1320 an overall aesthetically pleasing appearance.

Considering now the system 1310 in still greater detail, the video order confirmation system 1310 is a totally integrated audio and video confirmation system with a full duplex audio system including the speaker 1334 and microphone 1336 and a high quality display unit in the form of a liquid crystal display monitor 1338. The liquid crystal display monitor 1338 when mounted near a display board, such as a display board 12 (FIG. 1), displays the order placed by a customer. Such a displayed order not only includes the item description of each item order, but also includes price, tax, subtotal and total. The order is entered by an order taker via a point of sale terminal.

Customers at the station 1320 are assured of order accuracy as a visual confirmation of the customer order is provided. Thus, there is no need for the order taker to verbally repeat the customer order. In this regard, the processing time for taking a customer order is substantially increased when compared to audio systems.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An order confirmation system, comprising:

a point of sales terminal for receiving order input information indicative of quantity and purchase item information;

signal generating means responsive to said order input information for generating a customer information signal indicative of transaction information including a description of an item to be purchased, the quantity of the item to be purchased, the price of the item to be purchased and the accumulated charges associated with a given transaction;

a video confirmation terminal for use by a customer and having audio communication means including a speaker and microphone for facilitating full duplex communication between an order taker at said point of sales terminal and said customer, and display means responsive to said customer information signal for displaying accumulatively, line by line the transaction information for said given transaction to facilitate entire order and purchase item verification by said customer at any time during an order taking process; and interface means for coupling together electrically said point of sales terminal and said video confirmation terminal to enable the customer to communicate order input information and verification information to said order taker and to enable the customer information signal to be coupled electrically to said display means to facilitate displaying the transaction information for verification by said customer;

wherein said video confirmation terminal includes a terminal housing for supporting said display means above the ground adjacent to a drive through lane; and means for mounting said display means within said terminal housing in a proper orientation to enable said customer to view the displayed transaction information easily for verification purposes;

wherein said video confirmation terminal further includes climate control means for facilitating the reliable operation of said display means in a variety of different kinds of weather climate conditions;

wherein said climate control means includes fan means mounted within said housing for circulating air within said terminal housing; temperature sensor means mounted at said terminal housing for generating a temperature signal indicative of the ambient temperature at said housing; and microcontroller means responsive to said temperature signal for controlling said fan means to facilitate maintaining the temperature at said housing within a desired temperature range between a maximum temperature under hot weather conditions and a minimum temperature under cold weather conditions;

wherein the temperature range between said maximum temperature and said minimum temperature is between about +50° C. and about −40° C.;

wherein said climate control means further includes a heater mounted in close proximity to said fan means within said housing for helping to maintain the temperature within said housing at a temperature equal to or greater than minus 40° C. under cold weather conditions; and wherein said temperature sensor means includes over-temperature sensor means for generating an excess temperature signal when the temperature within said housing is greater than +50° C.; and wherein said microcontroller means includes shut-down means responsive to said excess temperature signal for causing said display means to be electrically de-energized when the temperature within said housing is greater than +50° C.

2. An order confirmation system according to claim 1 wherein said climate control means further includes duct means mounted on said housing for directing air across a screen face portion of said display means to help maintain the temperature across the entire screen face at a substantially uniform temperature level.

3. An order confirmation system according to claim 2 wherein said display means is liquid crystal display means.

4. An order confirmation system according to claim 2, wherein said display means is light emitting diode display means.

5. An order confirmation system according to claim 2, wherein said display means is cathode ray tube display means.

6. An order confirmation system according to claim 2, wherein said means for mounting causes said screen face to be oriented in a forwardly downwardly orientation to help reduce glare on said screen face.

7. An order confirmation system according to claim 2, wherein said screen face is coated within an anti glare material to help reduce glare on said screen face.

8. An order confirmation system according to claim 2, wherein said climate control means further includes light sensor means mounted at said terminal housing for generating a light control signal indicative of the brightness of the ambient light enveloping said terminal housing; and wherein microcontroller means includes brightness control means responsive to said light control signal for causing the image brightness of the displayed transaction information to be adjusted relative to the brightness of the ambient light enveloping said terminal housing.

9. A method for taking and verifying an order using a point of sale terminal and a video confirmation terminal, the method comprising:

communicating a first ordered item via the video confirmation terminal to the point of sale terminal;

entering the first ordered item to initiate the sales transaction;

generating, responsive to the first item being entered, a first item signal indicative of the description, quantity, and price of the first ordered item;

generating, responsive to the first item being entered, a first subtotal signal, a first tax signal, and a first total signal for the first ordered item;

displaying, responsive to the generated first signals, continuously and uninterruptedly on the video confirmation terminal information indicative of the first item, the first subtotal, the first tax, and the first total signal so that the customer may view and verify that the video confirmation terminal display correctly identifies the ordered items and may also observe the current subtotal, current tax, and current total amounts due when the first item has been ordered;

communicating a next ordered item via the video confirmation terminal to the point of sale terminal;

entering the next ordered item;

generating, responsive to the next item being entered, an updated item signal indicative of the description, quantity, and price of the next ordered item;

generating, responsive to the next item being entered, an updated subtotal signal, an updated tax signal, and an updated total signal indicative of an accumulation of the first item ordered and the next item ordered;

deleting the display of the first subtotal, the first tax, and the first total, while continuing to display the first item;

displaying, responsive to the generated updated signals, continuously and uninterruptedly on the video confirmation terminal information indicative of the updated item, the updated subtotal, the updated tax, and the updated total; and maintaining continuously and uninterruptedly the display of the first item so that the customer may verify that the video confirmation terminal correctly identifies the ordered items and may also observe the subtotal, tax, and total amounts due when the next item has been ordered.

10. A method according to claim 9 further including supporting said video confirmation terminal above the ground adjacent to a drive through lane; and mounting said video confirmation terminal within said terminal housing in a proper orientation to enable said customer to easily view the displayed transaction information for verification purposes.

11. A method according to claim 9 further including facilitating the reliable operation of said video confirmation terminal in a variety of different kinds of weather climate conditions.

12. A method according to claim 9 further including generating a light control signal indicative of the brightness of the ambient light enveloping said video confirmation terminal.

13. A video confirmation terminal for use with a point of sales terminal adapted to generate a customer information signal in response to order input information indicative of the quantity and description of a purchase item information, said customer information signal being indicative of transaction information including a description of an item to be purchased, the quantity of the item to be purchased, the price of the item to be purchased, and the accumulated charges associated with a given transaction, comprising:

audio communication means having a speaker and microphone for facilitating full duplex communication between an order taker at said point of sales terminal and a customer at said video confirmation terminal;

display means responsive to said customer information signal for displaying accumulatively, line by line, the transaction information for said given transaction to facilitate verification by said customer at any time during an order taking process; and interface means disposed for coupling electronically said point of sales terminal to said audio communication means and said display means to enable the customer to communicate order input information and verification information to said order taker and to enable the customer information signal to be coupled electrically to said display means to facilitate displaying the transaction information for verification by said customer; and climate control means for facilitating the reliable operation of said display means in a variety of different kinds of weather climate conditions; and wherein said temperature sensor means includes over-temperature sensor means for generating an excess temperature signal when the temperature within said housing is greater than 50° C.; and wherein said microcontroller means includes shut-down means responsive to said excess temperature signal for causing said display means to be electrically de-energized when the temperature within said housing is greater than 50° C.

14. A video confirmation terminal for use with a point of sales terminal adapted to generate a customer information signal in response to order input information indicative of the quantity and description of a purchase item information, said customer information signal being indicative of transaction information including a description of an item to be purchased, the quantity of the item to be purchased, the price of the item to be purchased, and the accumulated charges associated with a given transaction, comprising:

audio communication means having a speaker and microphone for facilitating full duplex communication between an order taker at said point of sales terminal and a customer at said video confirmation terminal;

display means responsive to said customer information signal for displaying accumulatively, line by line, the transaction information for said given transaction to facilitate verification by said customer at any time during an order taking process; and interface means disposed for coupling electronically said point of sales terminal to said audio communication means and said display means to enable the customer to communicate order input information and verification information to said order taker and to enable the customer information signal to be coupled electrically to said display means to facilitate displaying the transaction information for verification by said customer; and climate control means for facilitating the reliable operation of said display means in a variety of different kinds of weather climate conditions; and wherein said climate control means further includes duct means mounted on said housing for directing air across a screen face portion of said display means to help maintain the temperature across the entire screen face at a substantially uniform temperature level.

15. A method for taking and verifying transaction items at a drive-up station, the method using a point of sale terminal and video confirmation terminal, the method comprising:

communicating a first transaction item via the video confirmation terminal to the point of sale terminal;

entering the first transaction item into the point of sale terminal to initiate a commercial transaction;

generating a transaction list signal indicative of the description of the first transaction item;

generating a subtotal signal indicative of the cost of the first transaction item;

generating a tax signal indicative of the tax on the first transaction item;

generating a total signal indicative of the accumulation of the subtotal signal and the tax signal;

displaying to the customer continuously on the video confirmation terminal information indicative of the transaction list, the subtotal, the tax and the total so the customer may verify the transaction list, subtotal, tax, and total transaction information at all times after the initiation of the commercial transaction;

communicating via the video verification terminal another transaction item to the point of sale terminal;

entering the another transaction item into the point of sale terminal;

generating an updated transaction list signal indicative of the description of the first transaction item and the another transaction item;

generating an updated subtotal signal indicative of the cost of the first transaction item and the another transaction item;

generating an updated tax signal indicative of the tax on the first transaction item and the another transaction item;

generating an updated total signal indicative of the accumulation of the subtotal signal and the tax signal;

displaying to the customer continuously on the video confirmation terminal information indicative of the updated transaction list, the updated subtotal, the updated tax and the updated total so the customer may verify the updated transaction list, updated subtotal, updated tax, and updated total at any time in the commercial transaction.

* * * * *